June 19, 1934.  J. A. FISHLEIGH  1,963,894
AGRICULTURAL IMPLEMENT
Filed April 27, 1932  3 Sheets-Sheet 1
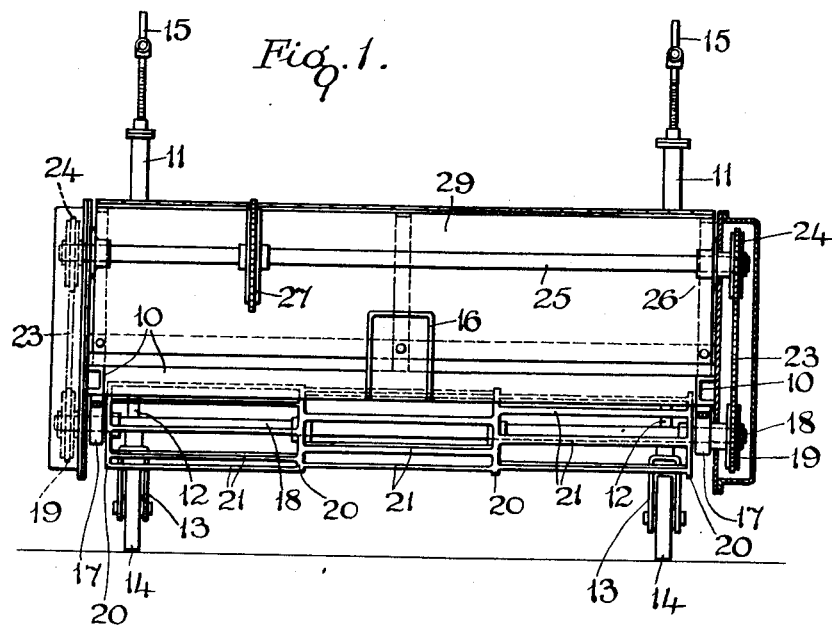
INVENTOR
John A. Fishleigh
BY
ATTORNEY

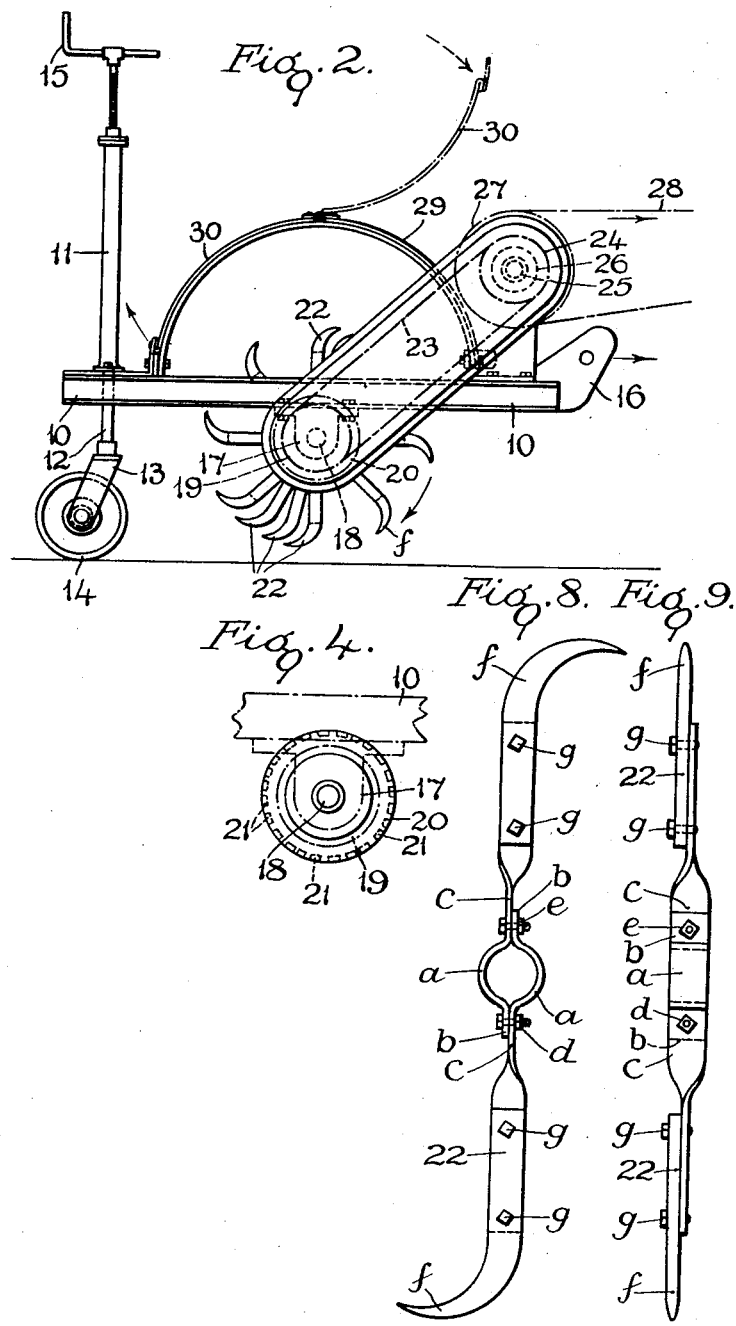

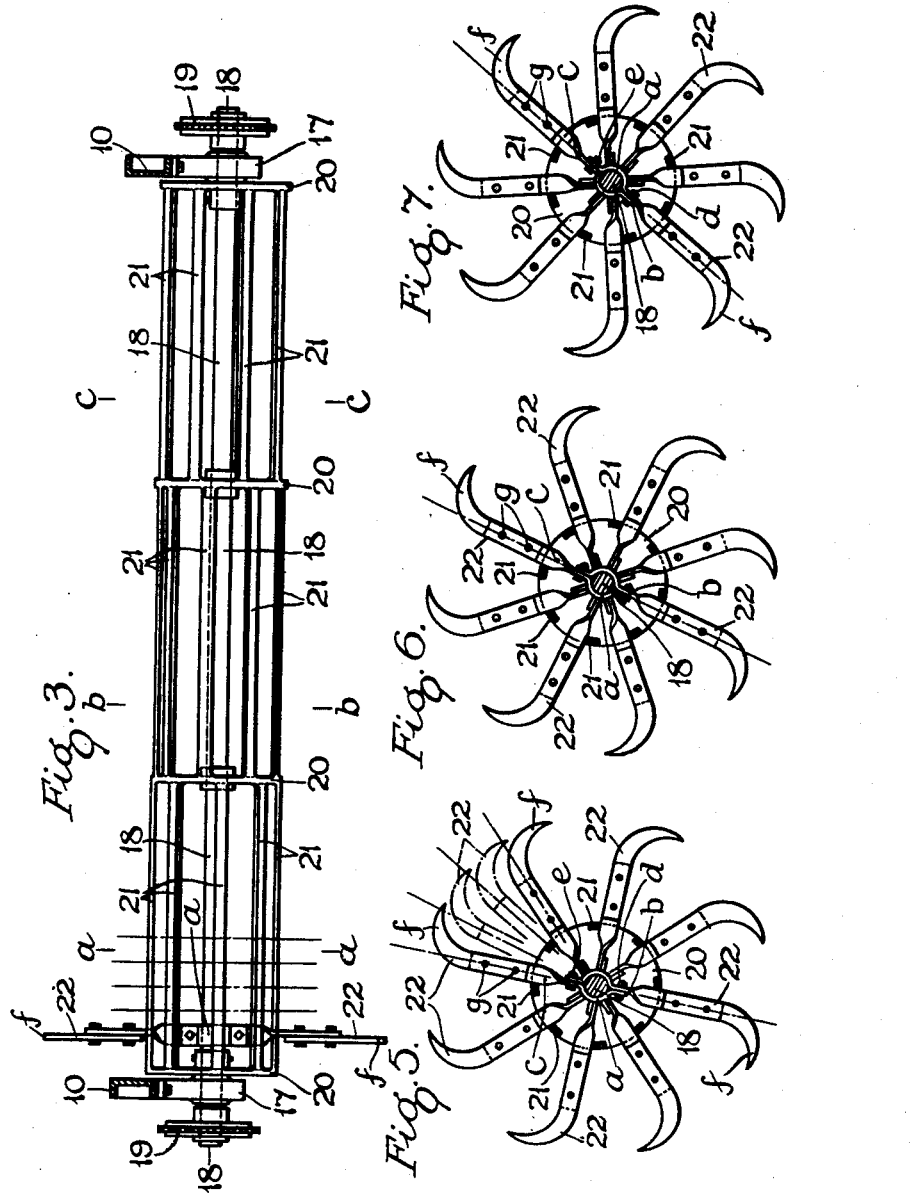

Patented June 19, 1934

1,963,894

UNITED STATES PATENT OFFICE 1,963,894

AGRICULTURAL IMPLEMENT

John Andrew Fishleigh, Buckland Brewer,
Bideford, England

Application April 27, 1932, Serial No. 607,852
In Great Britain May 9, 1931

2 Claims. (Cl. 97—215)

This invention relates to an agricultural implement and more specifically to a rotary cultivator, harrow or the like.

A primary object is to provide a rotary cultivator or harrow element which more effectively mounts and holds the tines or teeth so as to require less power for operation and insure more even pull or draft.

It is also an aim to produce such a construction as will enable a greater number of tines than heretofore to be disposed in the same given space of the rotary member or element.

My invention and the more specific objects thereof will be clearly understood from the following description and the construction shown on the accompanying drawings, in which:—

Figure 1 is a front view partly in section, the tines not being shown, and Figure 2 a side view of a cultivator construction according to my invention.

Figure 3 is a transverse section through the machine and particularly discloses the tine-carrying cage or drum and its drive.

Figure 4 is an end view of the parts of Figure 3.

Figures 5, 6 and 7 are sections on the lines a—a, b—b, c—c, respectively, of Figure 3.

Figure 8 is a side view and Figure 9 a front view of a pair of tines.

According to the drawings, I construct a frame 10, preferably oblong in shape and with its longer sides of a length to suit the width of ground it is desired to act upon during the movement of the tractor, and on this frame 10 preferably at or near each of the rear corners I mount a tubular post 11, screw threaded for part of the interior, and within each post 11 is positioned a rod 12 projecting below the frame and provided at its lower end with a fork 13 carrying a caster wheel 14. The upper part of each rod 12 is in screw threaded engagement with the interior of the associated post 11, and its upper end is provided with a handle 15, the operation of which by hand will raise or lower the frame 10 to vary the height of the frame 10 from the ground and for working purposes and also to determine the depth the tines shall enter the ground.

From the front of the frame 10, projects one or more arms 16 for pivotal connection to the tractor not shown, so that the frame 10 can have an up and down movement due to irregularities of the ground.

The frame 10 has depending bearings 17 which carry a shaft 18 which extends centrally across the frame 10 and on each end of the shaft 18 is mounted a sprocket wheel 19, 19 preferably positioned outside the bearings 17, 17 and on the shaft 18 between the bearings are also fixedly mounted a number of webs or discs 20, say four, and all are connected together by rods 21 in any suitable number, positioned next the peripheries of the webs or discs 20, and the rods 21 between the pairs of webs 20 are preferably arranged in staggered order and the webs and rods preferably formed as one structure as shown. Thus a tine-carrying drum or cage is formed.

Between each pair of webs or discs 20 and on the shaft 18 are mounted a number of tines 22, the outer ends of which project between and outwardly beyond the rods 21 and discs 20. Said tines 22 are arranged in staggered order and are so positioned that as each tine 22 acts upon the ground it will have a bearing on the adjacent rod 21, whereby the leverage on each tine 22 whilst engaging the ground will only take effect between the ends of the tines 22 and the rods 21, respectively, engaged thereby.

The tines 22 are curved, and used in pairs and each one constructed alike i. e. with a curved or recessed portion a at the end connected to the shaft 18 with a flat portion b, c at each side, such flat portions having holes so that when the two tines are connected to the shaft the recessed portions engage the shaft, and the pair of tines 22 are secured thereto by bolts and nuts d, e engaging the holes in the flat portion, the combined tines being somewhat in the form of the letter S and it is preferred that the flat portion c of each tine instead of being shaped at the end with a curve, may have a separate curved end portion f secured thereto by bolts g, as shown, such curved end portion f being of a superior metal to give longer life.

By this construction, should a tine or its curved end break it is easily replaced by another.

The sprockets 19 on the shaft 18 are connected by chains 23, 23 with sprockets 24, 24 on another shaft 25 mounted in bearings 26 on the frame 10, such shaft 25 carrying a sprocket 27 actuated by a chain 28 from gearing (not shown) fitted on the tractor and actuated therefrom under control of the driver.

Such tine ends f due to the staggered position of the tines, engage the ground in slightly overlapping paths so that a perfect disintegrating action is assured. Frame 10 has a cover 29 provided with a lid 30.

The working or ends of the tines in use are below the wheels 14 and hence by adjusting the frame 10, any depth of penetration, say up to approximately 8 inches can be obtained, and by lifting the frame 10, the tines may be raised above the ground so that the implement can be freely moved without engagement of the tines with the ground.

The revolution of the tines, and the number of tines employed may be such that each tine of each pair has action on the ground before the tractor has drawn the frame sufficient distance to leave the part of the ground being acted upon, thus insuring a more perfect disintegration.

What I do claim as my invention and desire to secure by Letters Patent is:—

1. A rotary cultivator element comprising a shaft, a plurality of sets of rods extending substantially parallel to and in outwardly spaced relation about the shaft, said rods also being circumferentially spaced apart in relatively close relation, and tines extending rigidly from said shaft through and beyond the spaces between the rods and in abutting contact with the leading edges of the adjacent rod, said tines being arranged in staggered pairs aligned diametrically on opposite sides of the shaft, the rods of one set continuing from one end of and in staggered relation to the rods of the other set.

2. A rotary cultivator element comprising a shaft, more than two disks on said shaft, rods substantially parallel with the shaft and relatively close together connecting adjacent disks outwardly of the shaft, the rods between each pair of disks being staggered with respect to the rods between such pair and the next adjacent disk, and tines extending rigidly from said shaft in staggered, connected pairs in substantially radial alignment on opposite sides of the axis of the shaft through and outwardly beyond the spaces between the rods and each in abutting contact with the adjacent rod.

JOHN ANDREW FISHLEIGH.